United States Patent
Schneider

[15] 3,644,005
[45] Feb. 22, 1972

[54] METHOD OF MAKING JOURNAL CONSTRUCTIONS

[72] Inventor: Karl-Heinz Schneider, Sonthofen, Germany
[73] Assignee: Robert Bosch GmbH, Stuttgart, Germany
[22] Filed: Jan. 28, 1970
[21] Appl. No.: 6,511

[30] Foreign Application Priority Data

Jan. 29, 1969  Germany.....................P 19 04 275.2

[52] U.S. Cl..............................................308/37, 308/237
[51] Int. Cl.........................................................F16c 29/12
[58] Field of Search..............................308/36, 37, 237, 1; 29/149.5 NM; 33/178 B

[56] References Cited

UNITED STATES PATENTS 2,514,956   7/1950   Kuebler..............................33/178 B Primary Examiner—Martin P. Schwadron
Assistant Examiner—Barry Grossman
Attorney—Michael S. Striker

[57] ABSTRACT

A tubular journal member of predetermined inner diameter and composed of material having a predetermined elasticity is provided. An element to be journaled in the journal member has an outer circumferential surface of a given diameter and at least one circumferential bead projecting from the surface by a predetermined amount. The bead is inserted through the journal member and the diameters, the predetermined amount of projection and the elasticity of the material of the journal member are so correlated that insertion of the bead through the journal member effects calibration of the inner diameter of the latter with the material of the journal member elastically yielding to the bead and thereupon returning to define with the outer circumferential surface a predetermined amount of play.

5 Claims, 2 Drawing Figures

PATENTED FEB 22 1972 3,644,005

INVENTOR
Karl-Heinz SCHNEIDER
By

*Michael F. Stul* his ATTORNEY

3,644,005

METHOD OF MAKING JOURNAL CONSTRUCTIONS

BACKGROUND OF THE INVENTION

The present invention relates generally to journals, and more particularly to journal constructions. the known journaled, kept In journal constructions such as are used particularly, but not exclusively, for distributors in combustion engines and which comprise a tubular journal member in which a shaft or the like is journaled with predetermined play, it is known to grind and/or polish the contacting surfaces of the journal member and the shaft or the like, hereafter identified as an element to be journaled individually journaled. impart to them the necessary dimensional tolerances. Of course, these elements are usually produced in a large series where the acceptance of certain tolerance variations is unavoidable. When, now, such an element to be journaled is associated with a journal member, both having been produced as part of a series, it is unavoidable that because of the aforementioned tolerance variations there is a certain amount of play. This, however, must be kept as small as possible because it has adverse influences on, for instance, the interrupter device of a distributor with which the journal member and the journaled member may be associated, and which interrupter device is controlled by the journaled member or element, that is by the shaft journaled in the journal member. Such tolerance variations influence the interrupter device and thereby directly the ignition timing. On the other hand, regardless of how important it is to keep the play as small as possible, there is the limiting factor that the tolerance variations—and thereby the resultant play—can be kept to the desired small values only by expensive additional production steps or by time-consuming—and therefore again expensive—matching of series-produced journal members and elements to be journaled.

SUMMARY OF THE INVENTION

It is, accordingly, an object of the present invention to overcome the aforementioned disadvantages.

More particularly, it is an object of the present invention to provide a method of making a journal construction wherein the element to be journaled and the journal member in which the element is to be journaled are provided with a predetermined amount of play in a precise and simple and cost-saving manner.

In pursuance of the above objects, and others which will become apparent hereafter, one feature of the invention resides in a method of making a journal construction which method, briefly stated, comprises making a tubular journal member having a predetermined inner diameter and being composed of material having a predetermined elasticity. An element to be journaled is made and provided with an outer circumferential surface of a given diameter and with at least one circumferential bead projecting from this surface by a predetermined amount. The bead is then inserted through the journal member and the diameters, the predetermined amount of projection and the elasticity of the material of the journal member are so correlated that insertion of the bead through the journal member effects calibration of the inner diameter of the latter with the material of the journal member elastically yielding to the bead and thereupon returning to define with the other circumferential surface of the element to be journaled a predetermined amount of play.

In other words, the precise calibration of the tubular journal member is effected by the bead of the element to be journaled, that is the calibration is effected by the element itself. This eliminates the separate calibration of the journal member and the element to be journaled.

Before the element to be journaled with its bead is inserted through the journal member, that portion of the outer circumferential surface of the element which is to be journaled within the journal member, and also the circumferential bead, are first ground to predetermined dimensions. Depending upon the hardness of the material of the tubular journal member and of the element to be journaled itself, the axial length of the circumferential bead, that is the thickness of the bead as seen in axial direction of the element to be journalled, is at least 0.5 mm. The bead projects from the outer circumferential surface of the element to be journaled by a predetermined amount which, depending upon the elasticity of the material of the tubular journal member and of the element to be journaled, is at least 0.003 mm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
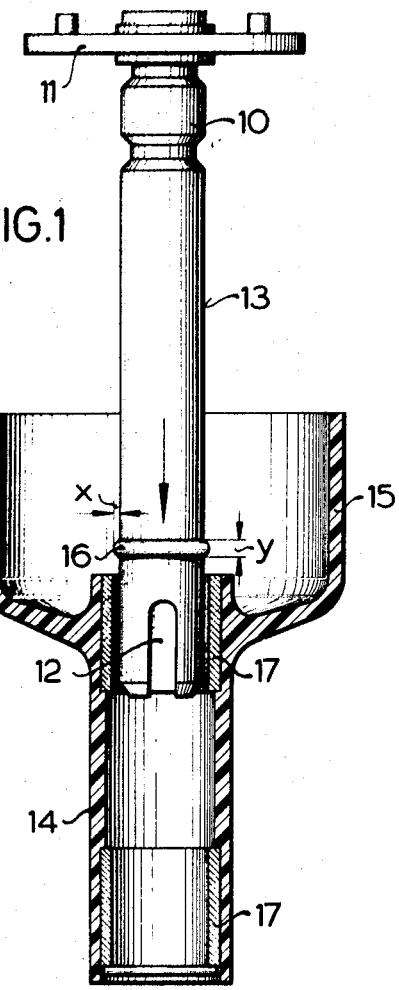
FIG. 1 shows a tubular journal member according to the present invention in axial section, associated with an element to be journaled.

Discussing firstly the embodiment illustrated in FIG. 1 it will be seen that reference numeral 10 identifies an element to be journaled, here in form of a shaft of a distributor for use in internal combustion engines. The shaft 10 carries a flyweight carrier 11 for the centrifugal force adjuster of a distributor. Such adjusters are well known in the art and form no part of the present invention.

The lower or leading end of the shaft 10 is provided with a recess 12 in which a coupling element for driving the shaft 10 in rotation can engage. Again, the coupling element is not shown because it forms no part of the invention.

The portion 13 of the shaft 10 is to be located within the shaft portion 14 of a tubular journal member, here illustrated as a distributor housing 15. At that end of the portion 13 which is adjacent the leading end of the shaft 10, the outer circumferential surface of the shaft 10 is provided with a radially projecting circumferential calibrating bead 16 which has been ground to generally roundish exterior outline (see FIG. 1).

The distributor housing 15 is provided in the shaft 14 thereof with two journal sleeves 17 which may for instance be composed of a sintered mixture of ferrite powder, copper powder and graphite powder.

The bead 16 is ground prior to calibrating of the sleeves 17, together with the outer circumferential surface of the portion 13 of shaft 10, to the necessary nominal outer diameter. Evidently, this value will depend upon the inner diameter of the sleeves 17 and the play which it is desired to obtain. Thereupon, the shaft 10 is inserted sequentially through the two sleeves 17 in the direction of the arrow shown in FIG. 1 and associated with the shaft 10. The axial length or thickness $y$ and the extent of radial projection $x$ of the bead 16 have been so correlated with the hardness or elasticity of the material of the sleeves 17 and of the shaft 10 that, as the bead 16 is sequentially forced through the two sleeves 17 the latter will first be radially expanded with concomitant elastic yielding of their material, and will subsequently elastically return downstream—as seen with reference to the direction of advancement of the shaft 10 as signified by the arrow—of the bead 16 to define with the outer circumferential surface of the portion 13 a predetermined amount of play, in the illustrated embodiment for instance 0.01 mm.

Figure 2:
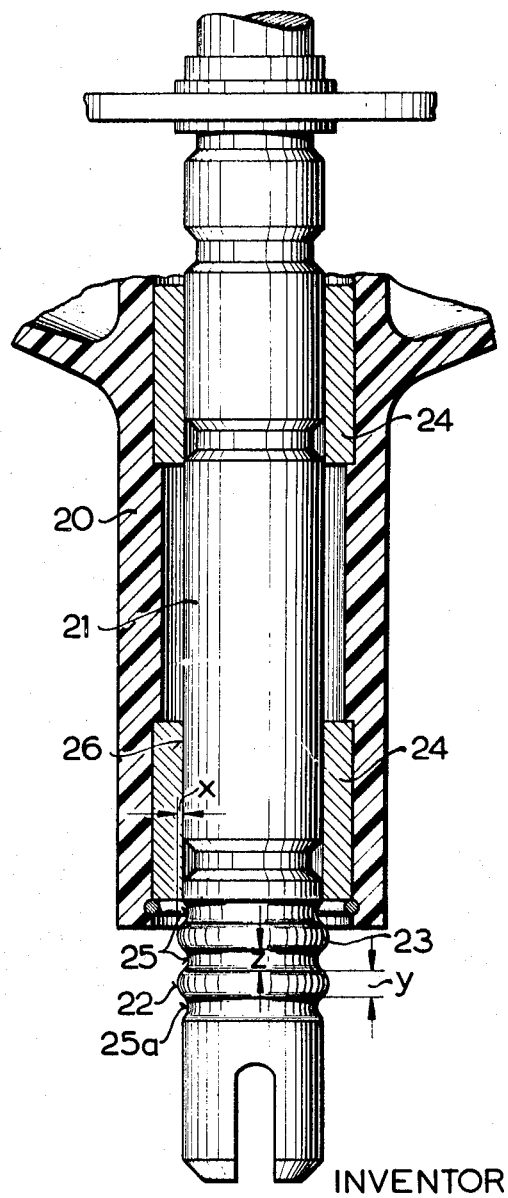
FIG. 2 is a view analogous to FIG. 1 but illustrating a further embodiment of the invention.

The embodiment illustrated in FIG. 2 is analogous to that of FIG. 1, but utilizes two of the beads, identified with reference numerals 22 and 23. Evidently, a different number may also be used but in FIG. 2 this possibility is illustrated on hand of two beads 22 and 23. The shaft is identified with reference numeral 21 and the portion 20 of the housing corresponds to the portion 14 in FIG. 1.

The beads 22 and 23 are serially forced through the axially spaced sleeves 24. The leading bead 22, that is the one which is first forced through each of the sleeves 24, has a dimension $x$ of 0.007 mm. whereas the second or downstream bead 23 has a larger dimension $x$ of 0.009 mm. The dimension $y$ in both beads 22 and 23 may be identical; here it is 2 mm. The beads 22 and 23 in addition are axially spaced from one another by a distance $z$ corresponding in the illustrated embodiment to 2 mm.

In the embodiment of FIG. 2 the leading or first bead 22 is ground whereas the second bead, located still ahead of the portion 26 of the shaft 21, is polished and serves to smooth and compact the material of the sleeves 24 in the region of their inner circumferential surfaces.

In FIG. 2 the shaft 21 is further provided with three circumferential grooves 25, 25a. The grooves 25 are located, respectively upstream of the bead 23 and between the same and the bead 22; the groove 25a is located downstream of the bead 22, that is ahead of it, and serves to collect contaminants.

The embodiment illustrated in FIG. 2, that is generally the use of two or more of the circumferential beads, is advisable when the not yet calibrated bores of the respective journal sleeves have large tolerances, or when the materials of the journal sleeves and/or the shaft to be journaled in them require the successive dimensional increase of the axially spaced circumferential beads in order to obtain, subsequent to passage of the beads through the respective sleeves, the predetermined amount of play. It is within the concept of the present invention to construct the novel journal construction in such a manner—by calibrating the sleeves accordingly—that no play exists or that a certain amount of compression exists.

It will be understood that each of the elements described above, or two or more together, may also find a useful application in other types of constructions differing from the types described above.

While the invention has been illustrated and described as embodied in a journal construction, it not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is:

1. A method of making a journal construction, comprising making a substantially rigid tubular journal member having a predetermined inner diameter and being composed of a material having limited elasticity; making an element to be journaled in said journal member and having an outer circumferential surface of a given diameter at least equal to said predetermined diameter and at least one circumferential bead projecting beyond said surface by a predetermined amount; and calibrating the inner diameter of said journal member by inserting said bead through said journal member, said diameters, said amount and said limited elasticity being so correlated that insertion of said bead through said journal effects calibration of the inner diameter of the latter with the material of said journal member elastically yielding to said bead and thereupon partially returning so that said inner diameter is permanently increased to a diameter slightly exceeding said given diameter whereby said journal member receives said element with a predetermined amount of play.

2. A method as defined in claim 1; and further comprising the step of grinding said bead together with such portions of said surface which are to be journaled within said journal member prior to inserting said bead through said journal member.

3. A method as defined in claim 1, wherein said element has at least one additional bead different from the first-mentioned bead; and further comprising the step of inserting said additional bead also through said journal member.

4. A method as defined in claim 1, wherein said element has at least one additional bead axially spaced from the first-mentioned bead, and wherein said journal member comprises two axially spaced sleeves; and further comprising the step of inserting each of said beads through at least one of said sleeves.

5. A method as defined in claim 4, wherein said beads are of different sizes from another, and wherein each of said beads is inserted through each of said sleeves.

* * * * *